United States Patent [19]

Nagaoka et al.

[11] Patent Number: 5,464,891
[45] Date of Patent: Nov. 7, 1995

[54] THERMOPLASTIC RESIN COMPOSITION

[75] Inventors: Kenji Nagaoka; Kaoru Kitadono, both of Ichihara, Japan

[73] Assignee: Sumitomo Chemical Co., Ltd., Osaka, Japan

[21] Appl. No.: 224,497

[22] Filed: Apr. 7, 1994

[30] Foreign Application Priority Data

Apr. 7, 1993 [JP] Japan .................................. 5-080583

[51] Int. Cl.⁶ .............................. C08K 5/20; C08L 77/00
[52] U.S. Cl. ........................ 524/230; 524/233; 525/149; 525/390; 525/391; 525/395; 525/396; 525/397
[58] Field of Search ................................... 525/391, 397, 525/390, 391, 395, 396

[56] References Cited

U.S. PATENT DOCUMENTS

| | | | |
|---|---|---|---|
| 3,751,388 | 8/1973 | Tabana et al. | 525/391 |
| 4,874,810 | 10/1989 | Lee, Jr. et al. | 524/505 |
| 4,957,965 | 9/1990 | Taubitz et al. | 525/66 |
| 4,957,966 | 9/1990 | Nishio et al. | 525/66 |
| 4,997,612 | 3/1991 | Gianchandai et al. | 264/211 |

FOREIGN PATENT DOCUMENTS 4033819  6/1992  Japan.

*Primary Examiner*—Ana L. Carrillo
*Attorney, Agent, or Firm*—Cushman Darby & Cushman

[57] ABSTRACT

The invention describes a thermoplastic composition made of a continuous phase made of crystalline thermoplastic resin A, a dispersed phase made of polyphenylene ether resin B, and an amide compound C represented by formula 1, $$R_4-CONH-R_2-HNOC-R_1-CONH-R_3-HNOC-R_5 \quad (1)$$

wherein $R_1$, $R_2$, and $R_3$ represent divalent hydrocarbon groups, which may be identical or different, and $R_4$ and $R_5$ represent monovalent hydrocarbon groups, which may be identical or different. The amide compound is present in an amount between about 0.1 and about 30 parts by weight per 100 parts by weight of the resins A and B mixed together.

17 Claims, No Drawings

THERMOPLASTIC RESIN COMPOSITION

BACKGROUND OF INVENTION

1. Field of Invention

The present invention relates to a thermoplastic resin composition, and more specifically, to a thermoplastic resin composition having excellent flow properties comprising a crystalline thermoplastic resin as a continuous phase and a noncrystalline polyphenylene ether resin as a dispersed phase.

2. Description of Related Art

Crystalline thermoplastic resins such as polyamides, polyesters, and polyphenylene sulfides have several drawbacks including significant deformation in molding and insufficient heat resistance. Noncrystalline thermoplastic resins are often blended with crystalline thermoplastic resins to improve poor qualities in the crystalline thermoplastic resins. Noncrystalline thermoplastic polyphenylene ether resins that have high heat resistance are especially useful for blending with crystalline thermoplastic resins.

A resin composition of polyphenylene ether and polyamide is described in Japanese Laid-Open Application (kokai) No. Sho 56-16525, and a composition of polyphenylene ether and polyphenylene sulfide is described in Japanese Patent Publication (kokoku) No. Sho 56-34032. In addition, a resin composition of polyphenylene ether and polyester is described in Japanese Laid-Open Application (kokai) No. Sho 49-50050, and a resin composition of polyphenylene ether and polyolefin is described in Japanese Laid-Open Application (kokai) No. Sho 58-103557.

These blended resins have reduced flow properties compared to crystalline thermoplastic resins, although the polyphenylene ether resin does improve some properties in the blend. Further blending of a low molecular weight compound into these blends to improve flow properties generally lowers the heat resistance and degrades the mechanical properties of the blend.

In one investigation, a diamide compound was blended to improve the flow properties, as described in Japanese Laid-Open Application (kokai) No. Sho 60-44547. However, this resin composition had the drawback that the diamide compound bled from the bulk of the material to the surface.

Novel thermoplastic resins with improved paint adhesion strength were reported in U.S. Pat. No. 5,166,237. The resins disclosed were a polyphenylene ether, a polyamide, a polymer that improved paint adhesion, and a compatibilizer.

There has been a long-felt need to prepare novel thermoplastic compositions which have good flow properties, the ability to deform minimally during molding, excellent mechanical properties, oil resistance, and heat resistance.

SUMMARY OF THE INVENTION

The present invention relates to a thermoplastic composition comprising a crystalline thermoplastic resin A, a polyphenylene ether resin B, and an amide compound C represented by formula 1,

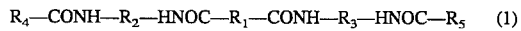

wherein $R_1$, $R_2$, and $R_3$ represent divalent hydrocarbon groups, which may be identical or different, and $R_4$ and $R_5$ represent monovalent hydrocarbon groups, which may be identical or different. The amide compound is present in an amount between about 0.1 and about 30 parts by weight per 100 parts by weight of resins A and B mixed together. Resin A forms a continuous phase, and resin B forms a dispersed phase.

DETAILED DESCRIPTION OF THE PRESENT INVENTION

The present invention relates to a thermoplastic composition comprising a crystalline thermoplastic resin A, a polyphenylene ether resin B, and an amide compound C represented by formula 1,

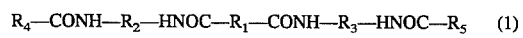

wherein $R_1$, $R_2$, and $R_3$ represent divalent hydrocarbon groups, which may be identical or different, and $R_4$ and $R_5$ represent monovalent hydrocarbon groups, which may be identical or different. The amide compound is present in an amount between about 0.1 and about 30 parts by weight per 100 parts by weight of resins A and B mixed together. Resin A forms a continuous phase, and resin B forms a dispersed phase.

The crystalline thermoplastic resin A of the present invention can be any thermoplastic resin having a crystallinity not less than about 30%, for example:

- polyamides, such as polyamide 6, polyamide 66, polyamide 46, and polyamide 12;
- polyesters, such as poly(ethylene terephthalate), poly(butylene terephthalate) and poly(ethylene naphthalate);
- polyolefins, such as polyethylene and polypropylene;
- polyketones, such as poly(oxyphenylene carbonylphenylene oxyphenylene) and poly(oxyphenylene carbonylphenylene);
- polyarylene sulfides, such as polyphenylene sulfide; and
- polyacetals, such as polyoxymethylene. Polyamides and polyarylene sulfides are preferred.

Polyphenylene ether resin B of the present invention is a polymer with monomer unit expressed by formula 2.

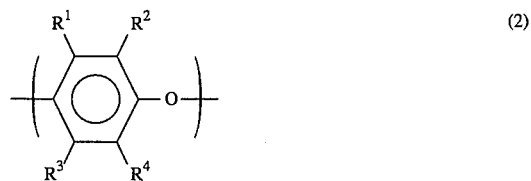

In formula 2, $R_1$, $R_2$, $R_3$, and $R_4$ can be hydrogen atoms, halogen atoms, hydrocarbon groups, substituted hydrocarbon groups, hydrocarbon groups with oxygen, or substituted hydrocarbon groups with oxygen. Substituents of the substituted hydrocarbon groups or substituted hydrocarbon groups with oxygen are thermally stable groups, for example: halogen atoms, such as fluorine, chlorine, bromine, or iodine; or hydroxyl, amino, nitro, cyano, carboxyl, amide, ether, sulfide, or sulfonic acid groups.

The polyphenylene ether resin in formula 2 can be, for example, poly(2,6-dimethyl-1,4-phenylene ether), poly (2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-butyl-1,4-phenylene ether), poly(2,6-dipropenyl-1,4-phenylene ether), poly(2,6-didodecyl-1,4-phenylene ether), poly(2,6-diphenyl-1,4-phenylene ether), poly(2,6-dimethoxy-1,4-phenylene ether), poly(2,6-diethoxy-1,4 -phenylene ether), poly(2-methoxy-6-ethoxy-1,4-phenylene ether), poly(2- ethyl-6-octadecyl-oxy-1,4phenylene ether), poly(2-methyl-6-phenyl-1,4-phenylene ether), poly(2-methyl-4-phenylene ether), poly(2-ethoxy-1,4-phenylene ether), poly(2-chloro-1,4-phenylene ether), poly(3-methyl-6-t-butyl-1,4 -phenylene ether), poly(2,6dichloro-1,4-phenylene ether), poly(2,5-dibromo-1,4-phenylene ether), or poly(2,6-dibenzyl-1,4-phenylene ether).

Polyphenylene ether resin B can be, for example, a copolymer comprising monomer units found in the above polyphenylene ethers. The copolymers can also be, for example, prepared from multi-substituted phenols such as 2, 3,6-trimethylphenol, 2,3,5,6-tetramethylphenol, or 2,6-dimethylphenol.

Polyphenylene ether resin B can be, for example, a graft copolymer modified with a styrene compound such as styrene or α-methylstyrene.

By preference, resin B is poly(2,6-dimethyl-1,4-phenylene ether), a copolymer of 2,6-dimethylphenol and 2,3,6-trimethylphenol, or a mixture thereof.

Styrene or polystyrene units can be incorporated into the structure of the polyphenylene ether resin to lower the glass transition temperature and improve processability.

The molecular weight of polyphenylene ether resin B can be expressed by intrinsic viscosity measured in chloroform at 30° C. Although the preferable range of molecular weight depends on the application, intrinsic viscosity can be, for example, between about 0.1 and about 0.7 dl/g, and more preferably, between about 0.2 and about 0.6 dl/g.

Suitable methods for preparing polyphenylene ether resins are described, for example, in U.S. Pat. Nos. 3,306,874, 3,306,875, and 3,257,357, and in Japanese Patent Publication (kokoku) No. Sho 52-17880, Japanese Laid-Open Application (kokai) No. Sho 50-51197, and No. Hei-1-304119, the complete disclosures which are incorporated herein by reference.

The amide compound C can be, for example, represented by formula 1 shown previously. $R_1$ can be, for example, a divalent hydrocarbon group, preferably a divalent aliphatic hydrocarbon group. $R_2$ and $R_3$ can be, for example, identical or different divalent hydrocarbon groups, preferably divalent hydrocarbon groups having between about 2 and about 20 carbon atoms. $R_4$ and $R_5$ can be, for example, identical or different monovalent hydrocarbon groups, preferably monovalent saturated aliphatic hydrocarbon groups having about 10 or more carbon atoms and, more particularly, between about 10 and about 20 carbon atoms.

Amide compound C can be, for example, a compound represented by formulas 3–6 shown below, or a mixture thereof.

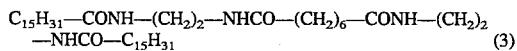

$$C_{15}H_{31}\text{—CONH—}(CH_2)_2\text{—NHCO—}(CH_2)_6\text{—CONH—}(CH_2)_2\text{—NHCO—}C_{15}H_{31} \quad (3)$$

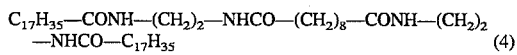

$$C_{17}H_{35}\text{—CONH—}(CH_2)_2\text{—NHCO—}(CH_2)_8\text{—CONH—}(CH_2)_2\text{—NHCO—}C_{17}H_{35} \quad (4)$$

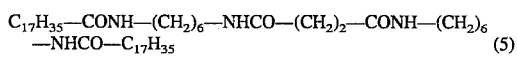

$$C_{17}H_{35}\text{—CONH—}(CH_2)_6\text{—NHCO—}(CH_2)_2\text{—CONH—}(CH_2)_6\text{—NHCO—}C_{17}H_{35} \quad (5)$$

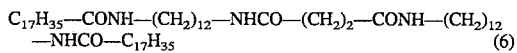

$$C_{17}H_{35}\text{—CONH—}(CH_2)_{12}\text{—NHCO—}(CH_2)_2\text{—CONH—}(CH_2)_{12}\text{—NHCO—}C_{17}H_{35} \quad (6)$$

Amide compound C can be prepared, for example, from carboxylic acid and diamine as raw materials, according to procedures described in Japanese Laid-Open Application (kokai) No. Hei-3-153793.

Crystalline thermoplastic resin A forms a continuous phase and noncrystalline polyphenylene ether resin B forms a dispersed phase. The average particle diameter of the dispersed phase cannot be greater than about 20 micrometers, and preferably is not greater than about 10 micrometers. More advantageously, this diameter is not greater than about 5 micrometers, and most advantageously, this diameter is less than about 1.5 micrometers.

Amounts of crystalline thermoplastic resin A and noncrystalline polyphenylene ether resin B can be varied, provided that resin A forms a continuous phase and resin B forms a dispersed phase. Preferably, the amount of resin A is between about 25 and about 99 parts by weight per 100 parts by weight of the mixture of A and B. More preferably, the amount of resin A is between about 35 and about 90 parts by weight per 100 parts by weight of the mixture of A and B. Preferably, the amount of resin B is between about one and about 75 parts by weight per 100 parts by weight of the mixture of A and B. More preferably, the amount of resin B is between about 10 and about 65 parts per 100 parts by weight of the mixture A and B.

The amount of amide compound C can be, for example, between about 0.1 and about 30 parts by weight, although preferably, it is between about 1 and about 15 parts by weight, per 100 parts by weight of the mixture of resins A and B. If amide compound C is present in amounts less than about 0.1 parts by weight, then flow properties of the blend are not sufficiently improved. However, if amide compound C is present in greater amounts, then the blend has insufficient mechanical strength.

A compatibilizing agent D can be used to improve the compatibility of the crystalline thermoplastic resin and the polyphenylene ether resin as disclosed in Japanese Laid-Open Application (kokai) No. Sho 63-183954, the complete disclosure of which is incorporated herein by reference.

Compatibilizing agent D can be, for example, a compound that contains a carboxyl, acid hydride, acid amide, imide, carboxylate, epoxy, amino, isocyanate, oxazoline ring, or hydroxyl group.

Preferably, the compatibilizing agent D is maleic anhydride, maleic acid, fumaric acid, itaconic acid, glycidyl acrylate, glycidyl methacrylate, allylglycidyl ether, or a polyisocyanate.

"Polyisocyanate" means an organic compound with at least two isocyanate and/or isothiocyanate groups per molecule.

The blended resin can further include a filler E. Suitable materials for filler E include, among others, inorganic fibers such as glass, potassium titanate, rock wool, or carbon fibers; organic fibers such as aromatic polyamide or polybenzimidazol fibers; metal fibers such as stainless steel, brass, or aluminum zinc fibers; inorganic particles such as glass beads, wollastonite, mica, talc, clay, calcium carbonate, magnesium hydroxide, silica, or diatomaceous earth; metal particles such as aluminum or zinc flakes; or organic particles such as polyimide powder. Among these fillers, glass fibers are preferred.

The amount of filler E is not greater than about 200 parts by weight, preferably not greater than about 150 parts by weight, more preferably not greater than about 100 parts by weight, and most preferably, not greater than about 50 parts by weight, per 100 parts by weight of the mixture of resins A and B.

Blending can be carried out by any known method, for example, solution blending or melt-kneading. The melt-kneading method is preferable. In the melt-kneading method, components are blended with a conventional mixing unit used for mixing resins with a liquid or solid additive, for example: a Henschel mixer, a super mixer, a ribbon blender, or a V-blender. After the components are sufficiently homogeneous, components are melt-kneaded with a conventional melt-kneading machine, for example: a Banbury mixer, a Plastomill, a Brabender Plastograph, or a single screw or twin screw extruder.

The melt-kneading temperature can be, for example, between about 150° and about 400° C., and preferably, between about 200° and about 350° C.

The resin can further comprise an elastomer, a flame-retardant, a stabilizer, a plasticizer, a lubricant, or other additives.

The elastomer can be, for example: polybutadiene, polyisoprene, butyl, ethylene-propylene copolymer, ethylene/propylene/nonconjugated diene terpolymer, butadiene-styrene copolymer, butadiene-acrylonitrile copolymer, hydrogenated or non-hydrogenated styrene-conjugated diene block copolymer, polyester, acrylic, or silicone rubber, or modifications of these rubbers.

Preferably, the elastomer is ethylene-propylene copolymer rubber, ethylene/propylene/nonconjugated diene terpolymer rubber, or styrene-conjugated diene block copolymer rubber. The styrene-conjugated diene block copolymer rubber can be, for example, a partially-hydrogenated or non-hydrogenated styrene-isoprene diblock copolymer rubber and styrene-butadiene-styrene triblock copolymer rubber.

Suitable flame-retardants include, among others, phosphates such as triphenyl phosphate, tricresyl phosphate, phosphate prepared from a mixture of isopropyl phenol and phenol, or phosphate prepared from mixtures of two-functional phenols, such as benzohydroquinone and bisphenol A, and other alcohols or phenols; bromine compounds such as decabromobiphenyl, pentabromotoluene, decabromodiphenyl ether, hexabromobenzene, brominated polystyrene, or brominated epoxy resin; or nitrogen-containing compounds such as melamine or melamine triisocyanate.

A variety of stabilizers are suitable, of which sterically-hindered phenols, organic phosphates, oxalic diazidos, or sterically hindered amines, are exemplary.

A variety of lubricants are suitable, of which polyethylene wax or paraffin are exemplary.

The amount of these additives can be varied as required for the use, and is readily determinable by those skilled in the art. Preferably, the amount of elastomer is not greater than about 100 parts by weight of the mixture of resins A and B. The amount of fire-retardant is, preferably, not greater than about 30 parts by weight, and more preferably is between about 1 and about 20 parts by weight. The amount of stabilizer is, preferably, not greater than about 20 parts by weight, and more preferably, between about 0.001 and about 10 parts by weight. The amount of lubricant is, preferably, not greater than about two parts by weight.

The thermoplastic resin composition can be, for example, used in casings, frames, connectors, switches, and other mechanical elements in electric, electronic and office automation apparatuses; magnetic flywheels, side view mirror stays, lamp reflectors, cylinder head covers, and gears in automobiles and vehicles; and housings, pulleys, and steering wheels in machines.

The complete disclosure of the priority document for the present application, Japanese Patent Application Number Hei 5-80583 filed Apr. 7, 1993, is incorporated herein by reference.

The invention is described further with use of the following non-limiting examples.

EXAMPLES

In the examples and comparative examples, the following abbreviations are used:

PPE1: Poly(2,6-dimethyl-1,4-phenylene ether) having intrinsic viscosity of 0.46 dl/g measured in chloroform at 30° C.;

PPE2: Poly(2,6-dimethyl-1,4-phenylene ether) having intrinsic viscosity of 0.30 dl/g measured in chloroform at 30° C.;

PA: polyamide-6 (trade name: CAPRON XPN-1546, Allied Signal Co., Ltd.);

PPS: Crosslinked polyphenylene sulfide (trade name: Liton M3910, Toray PPS Co., Ltd.);

SBS: Styrene-butadiene-styrene triblock copolymer rubber (trade name: CARIFLEX TR1101, Shell Chemical Co., Ltd.);

FIL: Filler comprised of an equal-weight mixture of glass fibers (diameter: 10 micrometer; length: 3 mm) and calcium carbonate (diameter: 2 micrometer);

MAH: Maleic anhydride as compatibilizing agent;

cMDI: Polymethylene polyphenyl polyisocyanate as compatibilizing agent (trade name: SUMIJULE 44V20, Sumitomo Bayer Urethane Co., Ltd.);

ADA: Adipic acid anilide; and

AM: The amide compound expressed by the formula (4) shown below (Lite Amide WH-255, by Kyoei Yushi K.K.).

$$C_{17}H_{35}-CONH-(CH_2)_2-NHCO-(CH_2)_8-CONH-(CH_2)_2-NHCO-C_{17}H_{35} \quad (4)$$

The average particle diameter of the polyphenylene ether resin (PPE), which forms a dispersed phase in the thermoplastic resin blend, was determined as follows. Each sample of resin was prepared for electron microscopic analysis by trimming, etching with chloroform, and depositing gold. Particle diameters were measured from a micrograph taken with a scanning electron microscope. The average diameter was determined according to formula 7 expressed as:

$$\text{Average Particle Diameter of } PPE = \Sigma(di^4 \times ni)/\Sigma(di^3 \times ni)$$

wherein di is the measured particle diameter and ni is the number of particles having diameter di.

The notched Izod impact strength (NI) and the heat distortion temperature (HDT) under a loading of 18.6 kg/cm$^2$ were measured for samples with 3.2 mm and 6.4 mm thickness formed by injection molding, according to ASTM D256 and D648.

The melt flow rate (MFR) was measured using a loading of 2.16 kg/cm$^2$, in accordance with JIS K7210 (equivalent to ASTM D1238).

Bleeding tests were carried out to determine migration of the amide from bulk to surface. A sheet sample of 3 mm thickness and 40×40 mm width and length, formed by injection molding, was placed in an oven at 150° C. for one hour. The surface of the sheet was observed before and after heat treatment for one hour.

EXAMPLES 1 AND 2 AND COMPARATIVE EXAMPLES 1–4

Thermoplastic resin compositions for examples 1 and 2 and comparative examples 1–4 were prepared by melt-kneading the compounds shown in Tables 1 and 2. The properties were tested, and the results are shown in Table 3.

The resin compositions of examples 1 and 2 had excellent melt flow rate, as well as excellent heat and impact resistance. Extrusion, injection, or blow molding allows use of these resins in many industrial settings.

TABLE 1

| Examples/ Comparative Examples (Comp. Ex.) | Formulation (1) | | | | | |
|---|---|---|---|---|---|---|
| | Crystalline thermoplastic resin (A) | | Polyphenylene ether resin (B) | | Amide compound (C) | |
| | Components | Parts by weight | Components | Parts by weight | Components | Parts by weight |
| Example 1 | PA | 45 | PPE1 | 45 | AM | 2 |
| Comp. Ex. 1 | PA | 45 | PPE1 | 45 | — | — |
| Comp. Ex. 2 | PA | 45 | PPE1 | 45 | ADA | 2 |
| Comp. Ex. 3 | PA | 20 | PPE1 | 70 | AM | 2 |
| Example 2 | PPS | 60 | PPE2 | 40 | AM | 2 |
| Comp. Ex. 4 | PPS | 60 | PPE2 | 40 | — | — |

TABLE 2

| Examples/ Comparative Examples (Comp. Ex.) | Formulation (2) | | | |
|---|---|---|---|---|
| | Compatibilizing agents (D) | | Additives | |
| | Components | Parts by weight | Components | Parts by weight |
| Example 1 | MAH | 0.45 | SBS | 10 |
| Comp. Ex. 1 | MAH | 0.45 | SBS | 10 |
| Comp. Ex. 2 | MAH | 0.45 | SBS | 10 |
| Comp. Ex. 3 | MAH | 0.45 | SBS | 10 |
| Example 2 | cMDI | 2 | FIL | 150 |
| Comp. Ex. 4 | cMDI | 2 | FIL | 150 |

TABLE 3

| Examples/ Comparative Examples (Comp. Ex.) | Properties | | | | |
|---|---|---|---|---|---|
| | Average particle diameter of PPE micrometers | NI kg. cm/cm | HDT °C. | MFR g/10 minutes | Bleeding |
| Example 1 | 0.8 | 13 | 107 | 43 *1 | none |
| Comp. Ex. 1 | 0.7 | 12 | 111 | 30 *1 | none |
| Comp. Ex. 2 | 0.8 | 12 | 109 | 48 *1 | occurred |
| Comp. Ex. 3 | Continuous phase | 4.8 | 166 | 8 *1 | none |
| Example 2 | 1.3 | 4.0 | 220 | 135 *2 | none |
| Comp. Ex. 4 | 1.5 | 4.2 | 223 | 76 *2 | none |

*1: Measurement temperature: 280° C.
*2: Measurement temperature: 300° C.

What is claimed is:

1. A thermoplastic resin composition comprising:

a continuous phase comprising a polyamide resin A;

a dispersed phase comprising a polyphenylene ether resin B;

at least one amide compound C represented by formula 1, $$R_4\text{—CONH—}R_2\text{—HNOC—}R_1\text{—CONH—}R_3\text{—HNOC—}R_5 \quad (1)$$

wherein $R_1$, $R_2$, and $R_3$ represent divalent hydrocarbon groups, which may be identical or different, and $R_4$ and $R_5$ represent monovalent hydrocarbon groups, which may be identical or different, and the amount of said amide compound C is between about 0.1 and about 30 parts by weight per 100 parts by weight with respect to the total weight of said resins A and B; and a compatibilizing agent D wherein said compatibilizing agent D is a compound having at least one functional group selected from the group consisting of carboxyl, anhydride, hydride, amide, imide, carboxylate, epoxy, amino, isocyanate, oxazoline ring and hydroxyl, and said resin A and said compatibilizing agent D are different.

2. A thermoplastic resin composition according to claim 1, wherein said compatibilizing agent D is selected from the group consisting of maleic anhydride, maleic acid, fumaric acid, itaconic acid, glycidyl acrylate, glycidyl methacrylate, and allylglycidyl ether.

3. A thermoplastic resin composition according to claim 1, wherein said compatibilizing agent D is maleic anhydride.

4. A thermoplastic resin composition according to claim 1, wherein said compatibilizing agent D is a polyisocyanate.

5. A thermoplastic resin composition according to claim 4, wherein said polyisocyanate is polyethylene polyphenyl polyisocyanate.

6. A thermoplastic resin composition according to claim 1, wherein the crystallinity of said resin A is not less than about 30%.

7. A thermoplastic resin composition according to claim 1, wherein said dispersed phase has an average particle diameter not greater than about 20 micrometers.

8. A thermoplastic resin composition according to claim 1, wherein said dispersed phase has an average particle diameter not greater than about 10 micrometers.

9. A thermoplastic resin composition according to claim 1, wherein said dispersed phase has an average particle diameter not greater than about 5 micrometers.

10. A thermoplastic resin composition according to claim 1, wherein said dispersed phase has an average particle diameter less than about 1.5 micrometer.

11. A thermoplastic resin composition according to claim 1, wherein said resin B is poly(2,6-dimethyl-1,4-phenylene ether).

12. A thermoplastic resin composition according to claim 1, wherein said amide compound C is at least one compound selected from the group of compounds consisting of compounds represented by formulas 3-6:

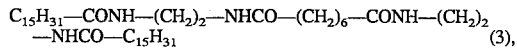
$$C_{15}H_{31}\text{—CONH—}(CH_2)_2\text{—NHCO—}(CH_2)_6\text{—CONH—}(CH_2)_2\text{—NHCO—}C_{15}H_{31} \quad (3),$$

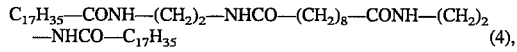
$$C_{17}H_{35}\text{—CONH—}(CH_2)_2\text{—NHCO—}(CH_2)_8\text{—CONH—}(CH_2)_2\text{—NHCO—}C_{17}H_{35} \quad (4),$$

$$C_{17}H_{35}\text{—CONH—}(CH_2)_6\text{—NHCO—}(CH_2)_2\text{—CONH—}(CH_2)_6$$

—NHCO—C$_{17}$H$_{35}$ (5), and

C$_{17}$H$_{35}$—CONH—(CH$_2$)$_{12}$—NHCO—(CH$_2$)$_2$—CONH—(CH$_2$)$_{12}$—NHCO—C$_{17}$H$_{35}$ (6).

13. A thermoplastic resin composition according to claim 1, wherein the amount of said resin A is between about 25 and about 99 parts by weight per 100 parts by weight of the total weight of A and B, and the amount of said resin B is between about one and about 75 parts by weight per 100 parts by weight of the total weight of A and B.

14. A thermoplastic resin composition according to claim 1, wherein the amount of said resin A is between about 35 and about 90 parts by weight per 100 parts by weight of the total weight of A and B, and the amount of said resin B is between about 10 and about 65 parts by weight per 100 parts by weight of the total weight of A and B.

15. A thermoplastic resin composition according to claim 1, wherein said composition further comprises a filler present in an amount not greater than about 200 parts by weight per 100 parts by weight of the total weight of resins A and B.

16. A thermoplastic resin composition according to claim 1, wherein said resin A is at least one polyamide selected from the group consisting of polyamide 6, polyamide 66, polyamide 46, and polyamide 12.

17. A thermoplastic resin composition comprising:

a continuous phase comprising a resin A selected from the group consisting of polyamide 6, polyamide 66, polyamide 46, and polyamide 12;

a dispersed phase comprising a polyphenylene ether resin B;

at least one amide compound C selected from the group consisting of compounds represented by formulas 3-6:

C$_{15}$H$_{31}$—CONH—(CH$_2$)$_2$—NHCO—(CH$_2$)$_6$—CONH—(CH$_2$)$_2$—NHCO—C$_{15}$H$_{31}$ (3),

C$_{17}$H$_{35}$—CONH—(CH$_2$)$_2$—NHCO—(CH$_2$)$_8$—CONH—(CH$_2$)$_2$—NHCO—C$_{17}$H$_{35}$ (4),

C$_{17}$H$_{35}$—CONH—(CH$_2$)$_6$—NHCO—(CH$_2$)$_2$—CONH—(CH$_2$)$_6$—NHCO—C$_{17}$H$_{35}$ (5), and C$_{17}$H$_{35}$—CONH—(CH$_2$)$_{12}$—NHCO—(CH$_2$)$_2$—CONH—(CH$_2$)$_{12}$—NHCO—C$_{17}$H$_{35}$ (6)

wherein the amount of said amide compound C is about 0.1 to about 30 parts by weight per 100 parts by weight of said resins A and B; and maleic anhydride, whereby said maleic anhydride compatibilizes said resins A and B.

* * * * *